United States Patent [19]
Feustel et al.

[11] Patent Number: 5,990,459
[45] Date of Patent: Nov. 23, 1999

[54] SYSTEM FOR CONTROLLING A PLURALITY OF RESISTIVE HEATING ELEMENTS

[75] Inventors: Hans-Peter Feustel, Roth; Klaus Beetz, Karlsruhe; Franz Bohlender, Kandel, all of Germany

[73] Assignees: David + Baader - DBK; Alcatel SEG AG, both of Germany

[21] Appl. No.: 08/949,639

[22] Filed: Oct. 14, 1997

[30] Foreign Application Priority Data

Oct. 15, 1996 [DE] Germany ............................ 196 42 442
Oct. 15, 1996 [DE] Germany ............................ 196 42 443

[51] Int. Cl.$^6$ ...................................................... H05B 1/02

[52] U.S. Cl. .......................... 219/486; 219/485; 219/202; 219/508; 219/505; 307/38

[58] Field of Search ..................................... 219/202–206, 219/483–486, 497, 499, 505, 501, 508, 481; 307/38–41

[56] References Cited

U.S. PATENT DOCUMENTS

| | | | |
|---|---|---|---|
| 4,138,607 | 2/1979 | Engelmann | 219/497 |
| 4,920,252 | 4/1990 | Yoshino | 219/497 |
| 5,521,359 | 5/1996 | Bone | 219/718 |
| 5,528,016 | 6/1996 | Mogi | 219/486 |
| 5,658,480 | 8/1997 | Tennant et al. | 219/519 |

FOREIGN PATENT DOCUMENTS

| | | |
|---|---|---|
| 0567402 | 10/1993 | European Pat. Off. . |
| 3447182 | 12/1989 | Germany . |
| 4345056 | 7/1995 | Germany . |

*Primary Examiner*—Mark Paschall
*Attorney, Agent, or Firm*—Darby & Darby, P.C.

[57] ABSTRACT

An electric heating system comprising at least two electric heating resistors, the heating power of which being adjusted by a control device comprising a plurality of controllers each one of which has one of the electric heating resistor associated with it, wherein the control range of the control means is distributed over the controllers and wherein a different control range is associated to each controller.

13 Claims, 5 Drawing Sheets

SYSTEM FOR CONTROLLING A PLURALITY OF RESISTIVE HEATING ELEMENTS

BACKGROUND OF THE INVENTION

The present invention refers to an electric heating system, the heating power of which is adjustable by a control means.

Electric heatings or heating systems are, for example, required for different applications in motor vehicles, for example for heating the air within the vehicle, for pre-heating the cooling water in water-cooled engines, for pre-heating the spark plugs in self-igniting internal combustion engines, for heating the fuel (diesel) etc. Heating systems of that kind usually consist of a heating with at least one heating stage, each comprising at least one heating element (for example provided as a heating resistor) for generating a predetermined heating power, as wellas of a control unit for monitoring the chronological course and for defining the heating power; the heating and the control unit are provided as separate modules (functional units) and are arranged at different positions within the motor vehicle.

It is a disadvantage that on one hand a plurality of connection lines is required between the heating and the control unit (which is connection with space requirements, costs, electromagnetical compatibility problems) and that on the other hand the dissipation power has to be carried off separately.

The control unit can be realized so as to control the different controllers which cause different control responses upon occurrence of a control deviation or control difference; proportional controller, integral controller, differential controller, linear controller or switchable step controllers are for example conmmonly used. In order to reduce the load of the control means, said control means may be composed of a plurality of controllers that are generally formed as switchable step controllers and may be activated or deactived for example by switching operations. The problem that occurs in this case (in particular in step controllers) is the delimitation of the range of action of the different controllers, i.e. the transition between the control ranges of the controllers is not clearly defined; this will lead to interferences of the control or of the control response (occurrence of dead ranges, overlappings, hystereses, undefined conditions etc.) and electromagnetical compatibility interferences, the reduction of which requiring expensive components

SUMMARY OF THE INVENTION

The object of the invention is to provide a simple electric heating working at a low dissipation lower.

This object is solved according to the invention by the features of patent claim 1.

Advantageous developments of the method are part of the further claims.

In the present heating system, the heating comprising at least two heating stages is provided as a control path of a control loop, which together with the control means of the control loop is integrated into a common housing. In this control loop, the heating power of the heating (i.e. of the heating stage/s) is to be controlled as a controlled variable; however, instead of the actual controlled variable heating power, a variable determining the heating power is often preferably used as actual controlled variable, i.e. it is either the current at the heating stage/s or the heating elements (the heating voltage) that is controlled through the heating stage/s or the heating elements (the heating current) or the voltage is controlled. In chis (e.g. voltage-controilcd) closed-loop control, the target value of the variable determining the heating power (e.g. the heating voltage) is predetermined, this target value is compared to the actual value of the variable determining the heating power (e.g. the heating voltage) and deviations between the target value and the actual value (the control deviation or control difference) are minimized automatically by feedback within the control loop.

Preferably, at least one linear controller is used as a control means; linear controllers of that kind (steady controllers) do not have irregularities in their control characteristic (contrary to a switched controller). When using a plurality of linear controllers, these controllers are connected parallel in cascade so that only one of the linear controllers in the linear operation is operated at a time and thereby determines the control response.

The target value of the controlled variable heating power or the target value of the variable determining the heating power can either be varied by means of a command variable, which is generated e.g. by means of an external input signal supplied to the control loop or by means of a direct control signal (generated e.g. in the control loop) for the heating power or for the variable determining the heating power.

The heating elements of the heating stage/s or the heating (control path) providing the controlled variable heating power and the variable determining the heating power are preferably formed as heating resistors.

The semiconductor components of this control means, in particular the power transistors thereof are preferably arranged on a common carrier body (e.g. on a copper plate) having a high heat conductivity in order to reduce thermal resistance.

The heating system may be used for heating media bound to a circulatory system, i.e. media (e.g. water, air, oil etc.) located in a heating circuit and/or in a cooling circuit of the motor vehicle (e.g. for the heating of cooling water of the motor vehicle); as an alternative it may also be used for heating media not bound to a circulatory system (e.g. for the heating of the compartment of the motor vehicle).

The presented heating system combines several advantages:

By integration of the control loop formed by control means (linear controller) and control path (heating of heating stage/s with heating elements) into one housing
- the heating system can be realized as a compact, functioning unit,
- an adaptation between the heating and the control unit is not required,
- external connections require few effort, the heating elements of the heating stage/s do not have to be connected by the user,
- the dissipation power (of the semiconductor elements) of the control means is utilized for heating, whereby moreover a linear relation between the heating currents and the heating power is achieved.

By realizing the control means by means of a linear controller or by means of a plurality of Linear controllers (connected in parallel), only one of which being linearly operated at a time
- switching operations are avoided and in consequence thereof the interferences of the control caused by the switching operation (occurrence of dead ranges, overlappings, hystereses, undefined conditions etc.)
- the electromagnetical compatibility interferences are mostly avoided, so that expensive components for eliminating the electromagnetical compatibility problems are not required, By the arrangement of the semiconductor components of the control means on a common carrier body having a high heat conductivity, a reduction of the thermal resistance of the semiconductor components of the control means (e.g. the linear controller) and thus a reduction of the temperature load of the semiconductor components of the control means is achieved.

BRIEF DESCRIPTION OF THE DRAWINGS

The heating system of the invention as an embodiment of the cooling water heating of a motor vehicle is now described with reference to the drawing (FIGS. 1 to 7).

DETAILED DESCRIPTION OF THE PREFERRED EMBODIMENTS

The heating power of the heating elements or the heating system shall be adjusted or predetermined dynamically and statically with a minimum error.

Figure 2:
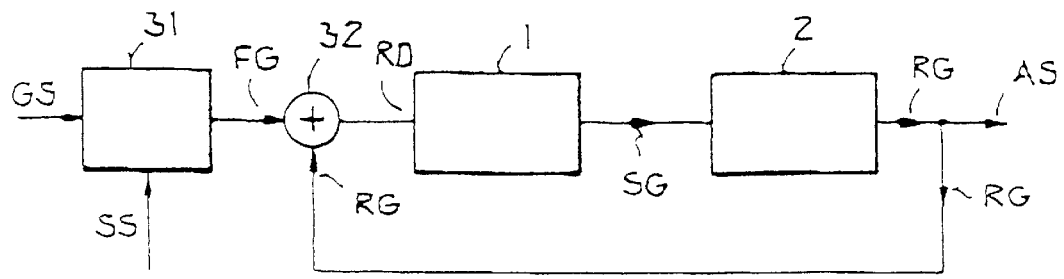
FIG. 2 is a basic circuit of the control loop.

For this purpose, according to FIG. 2, the heating power is control).ed as control variable RG by neans of the controlling variable SG voltage drop at heating 2 (heating voltage) within the voltage-controlled control loop RK composed of control means 1, control path 2 (heating of at least one heating stage with at least one heating element) and target value adjuster 31. For this aim a command variable FG is generated through the target value adjuster (e.g. by means of an external control signals GS) which can he activated/deactivad by means of the control signal SS, and this command variable is supplied to the comparator 32 as a target value definition of the controlled variable RG; the comparator 32 compares this target value of the controlled variable with the (fedback, actual value of the controlled variable RG and the control difference RD or the control deviation is formed by this comparison. This control difference RD or control deviation is supplied to the control means 1 (e.g. at least one linear controller) and the control means generates the controlling variable SG heating voltage. The control path 2 (heating) is driven by means of the controlling variable SG which causes the heating 2 (the heating stages or heating elements of the heating stages) to generate a certain heating power as (actual value of the) controlled variable RG. The heating power as controlled variable RG is on one hand output at the output terminal of the control loop RK as an output signal AS (supplied to the circulatory cooling water system, of the motor vehicle) which causes a heating of the cooling water, and on the other hand the heating power as controlled variable RG is supplied to the comparator 32 as actual value in the feedback loop of the control loop RK.

Instead of the actual cntrolled variable RG heating power, one of the two variables determining the heating power is used as controlled variable to simplify matters, i.e. either the current flowing through the heating 2 or the heating stages (heating current) or the voltage drop at the heating 2 or the heating stages (heating voltage); if for example the heating voltage is used as controlled variable RG, the controlled variable RG is in this case identical with the controlling variable SG1.

For a simplified heating system, a simple linear controller without a comparator 32 is sufficient for controlling the heating power.

Figure 3:
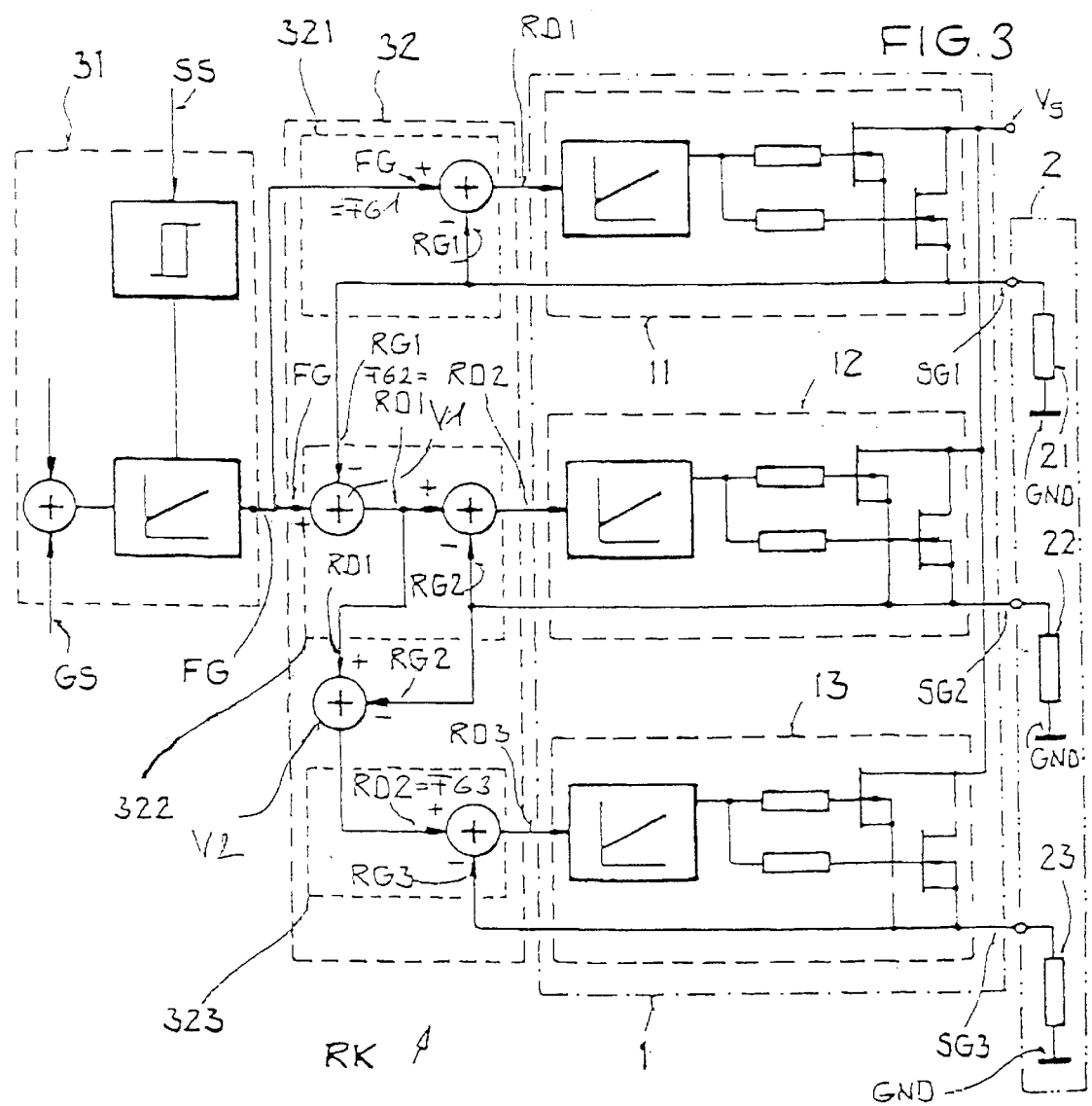
FIG. 3 is an embodiment of the control loop.

According to FIG. 3, the heating 2 is realized by means of three heating stages 21, 22, 23 connected in parallel and comprising one heating element each; the heating elements of the heating stages 21, 22, 23 are for example provided as heating resistors and are connected between supply voltage $V_s$ (e.g.+12 V) and reference potential GND. The control means 1 is realized by means of three linear controllers 11, 12, 13 connected in parallel, wherein each heating stage 21, 22, 23 or each heating element is connected with the output of a linear controller 11, 12, 13, and is thereby driven by a predetermined controlling variable SG (SG1, SG2, SG3) as voltage drop at the heating stage 21, 22, 23 or the heating element (heating voltage). The heating power or the heating voltage as redback controlled variablc RG (RG1, RG2, RG3) is supplied to the comparator 32 consisting of three comparator elements 321, 322, 323, wherein a comparator element 321, 322, 323 is associated to each linear controller 11, 12, 13; the comparator elements 321, 322, 323 are designed such that each linear controller 11, 12, 13 is driven by a predetermined control difference RD1, RD2, RD3 in such a manner that each linear controller 11, 12, 13 comprises a different control range (only one or the linear controllers 11, 12 13 is operated linearly at a time), causing a continuous control of the heating power without dead ranges, overlappings or irregularities (hysteresis, jumps) in the control characteristic.

The command variable FG generated by the target value adjuster 31 is supplied to the linear controller 11 for the lowest control range. By means of the higher next control range an additional heating power is to be effected only if the heating power determined by the command variable FG cannot be effected by the lower next control range. In order to generate a respective command variable for the higher next controller, the difference is formed between the command variable FG determined by the target value adjuster 31 and the controlling variable SG1 generated in accordance with this command variable by the first controller 11. As soon as the controller has reached the upper limit of its control range, a difference RD1 between the command variable FG and the controlling variable SG1 is generated which can no longer be compensated by the first controller 11. This difference RD1, which is determined in the comparator element V1, is supplied as command variable to the controller 12 of the adjoining control range. Similarly, the controller 12 cannot cause a further increase of the heating power when reaching the upper limit of its control range. The principle of generating a command variable RD1 for the controller 12 is also applied for detecting a command variable for the controller 13 of the adjoining control range. For this purpose, the difference RD2 is detected in the comparator element V2 from the difference RD1 supplied to the controller and the controlling variable SG2 generated in response to this variable by the controller 12. This difference RD2 is supplied to the controller 13 as command variable. The controller 13 thereby causes an additional heating power only if this heating power is requested by the target value adjuster 31 but can no longer be effected by the controllers 11 and 12 with the connected heating resistors 21 and 22.

In accordance with this principle, the entire heating range can be divided into an optional number of partial control ranges for example to thereby keep the average dissipation power capacity of the controller low. The externally determined target heating power is for this purpose first of all supplied to the lowest control range. For an even, i.e. continuous transition of the control ranges, only the difference from the target variable supplied to the lower next controller and the controlling variable generated by the controller thereupon is supplied to the controllers for the higher next control ranges, respectively.

Figure 1:
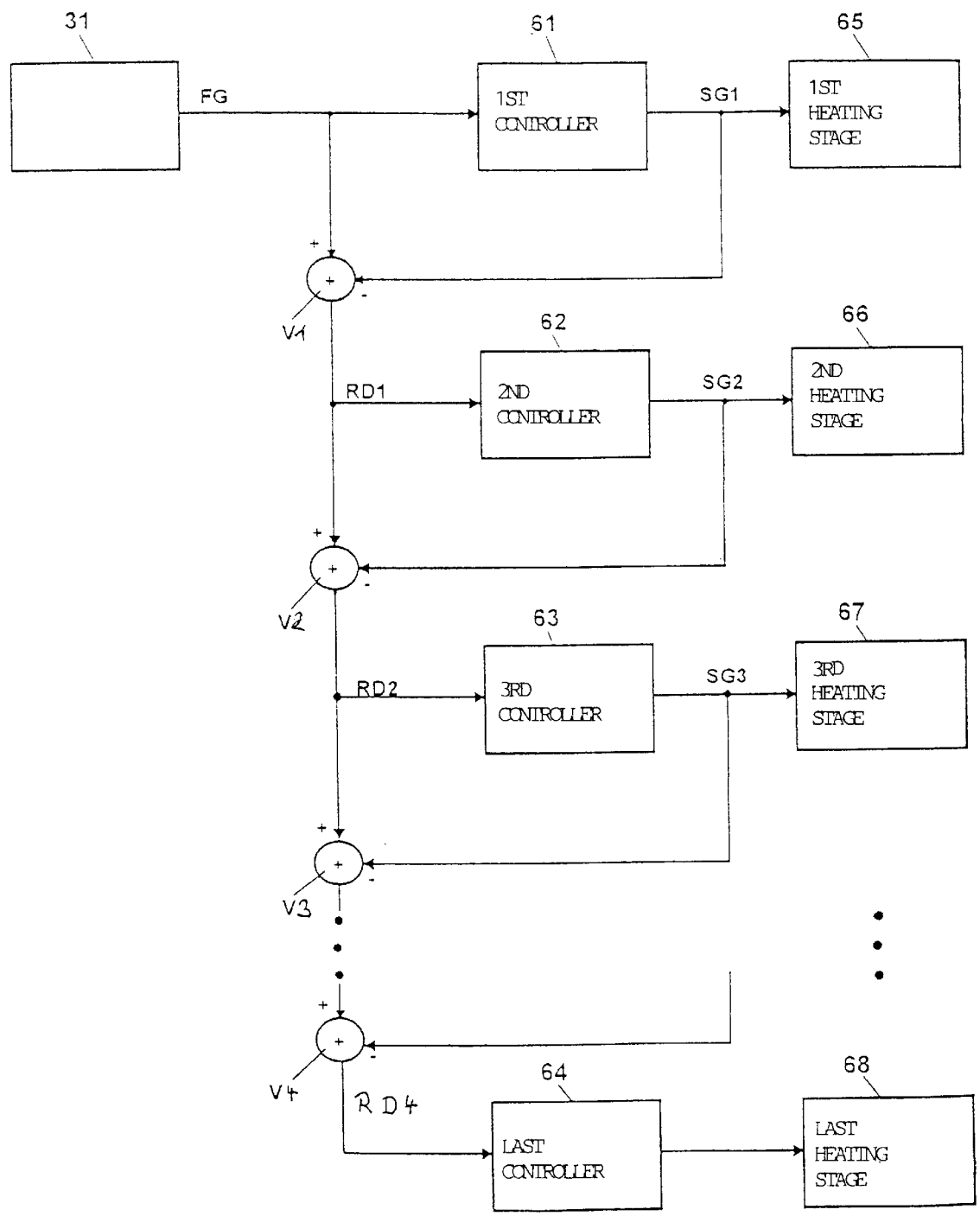
FIG. 1 is a basic circuit for illustrating the control of the electronic heating.

A more simple circuit diagram for illustrating this principle is shown in FIG. 1. In FIG. 1 only the essential elements of such heating system for controlling transitionless control ranges are shown.

The target heating power FG determined from the outside (e.g. by the target value adjuster 31) is supplied to the first controller 61. In accordance with the command variable FG, the first controller 61 generates a controlling variable SG1, which is supplied to the heating stage 65 connected to this controller. A difference that is generated if the first controller 61 with its controlling variable SG1 can no longer follow a further increase of the command variable FG by the target value adjusters 31, is formed in the comparator element V1. This difference RD1 is supplied to the second controller 62. The second controller generates in accordance with the difference RD1 supplied thereto a controlling variable SG2, which controls the heating power of the second heating stage 66. To control the third controller 63, the difference from the difference RD1 supplied to the second controller 62 and the controlling variable SG2 formed by the second controller 62 in accordance with the difference RD1, is supplied to the third controller 63 as command variable. Again, the third controller 63 generates in accordance with the difference RD2 a controlling variable SG3 in order to control the heating power of the third heating resistor 67. A further difference is formed in the controller V3 from the difference RD2 and the controlling variable SG3 until finally the difference RD4 is formed in the comparator V4 for the last controller 64 with tile heating stage 68 connected.

The command variable FG determining the target value is generated in FIG. 3 by means of the target value adjuster 31 for example in accordance with the degree of load of the generator of the motor vehicle; the command variable FG, for example, and thus the definition of target value for the heating power is varied by means of an externally supplied generator signal GS in accordance with the output capacity that can still be supplied by the generator—the heating power is, for example, controlled in a manner that the generator is operated shortly before its maximum, rating (e.g. at 95% of the miaximum rating). By means of a control signal SS supplied to the target value adjuister 31 the control loop RK is enabled or blocked (the control is activated or deactivated). Since the heating resistors of the heating stages 21, 22, 23 used as heating elements are connected to reference potential GND (earth) and the voltage (the heating voltage) dropping over these heating resistors is used as controlling variable, current measuring resistors are not required; furthermore, the control is also insensitive to tolerances of the resistance values; thus, the control loop RK can also be realized without adjustment by high-ohmic heating resistors of the heating stages 21, 22, 23 and by different resistance values of the heating resistors of the heating stages 21, 22, 23.

The cascade connected linear controllers 11, 12, 13 of the control means 10 which are connected in parallel are loaded by different control differences RD1, RD2, RD3 which are generated by means of the difference of the respective command variable FG1, FG2, FG3 (target value) and the respective controlled variable RG1, RG2, RG3 (actual value);

the first linear controller 1 with the control difference RD1 as difference of the command variable FG as command variable FG1 and the actual value RG1 of the controlled variable RG of the first linear controller 11, the second linear controller 12 with the control difference RD2 as difference of the control difference RD1 of the first linear controller 11 as command variable FG2 (command variable FG minus actual value RG1 of the controlled variable RG of the first linear controller 11) and the actual value RG2 of the controlled variable RG of the second linear controller 12, the third linear controller 13 with the control difference RD3 as difference of the control difference RD2 of the second linear controller 12 as command variable FG3 (command variable FG minus actual value RG1 of the controlled variable RG of the first linear controller 11 minus actual value RG2 of the controlled variable RG of the second linear controller 12) and the actual value RG3 of the controlled variable RG of the third linear controller 13.

The maximum value of the command variable FG is predetermined by means of the sum of the control limits of the individual linear controllers 11, 12, 13, and thus is predetermined by means of the maximum value of the controlled variable RG. The command variable FG is varied by means of the target value adjuster 31 for example in accordance with the externally supplied control signal GS. The control circuit 1 is enabled or blocked (the control is activated or deactivated) by means of a control signal SS supplied to the target value adjuster 31.

Figure 7:
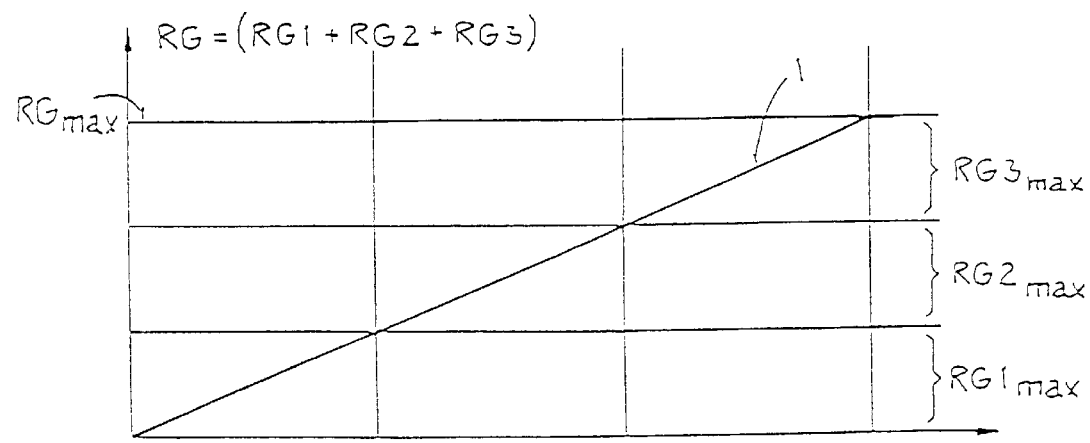
FIG. 7 is a diagram for illustrating the control response.
Figure 7:
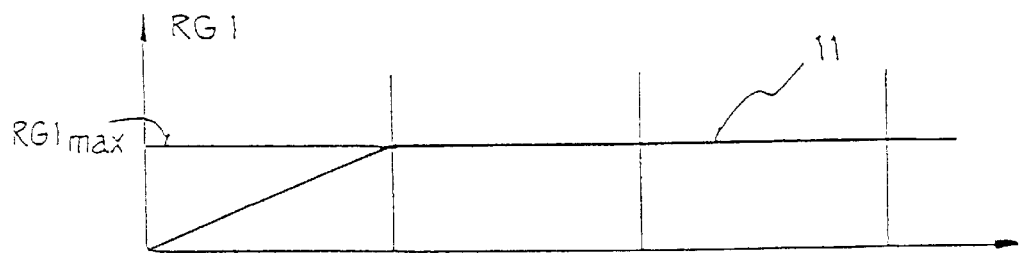
Figure 7:
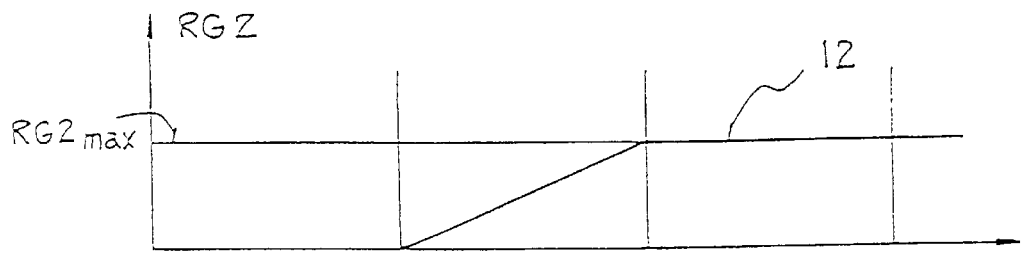
Figure 7:
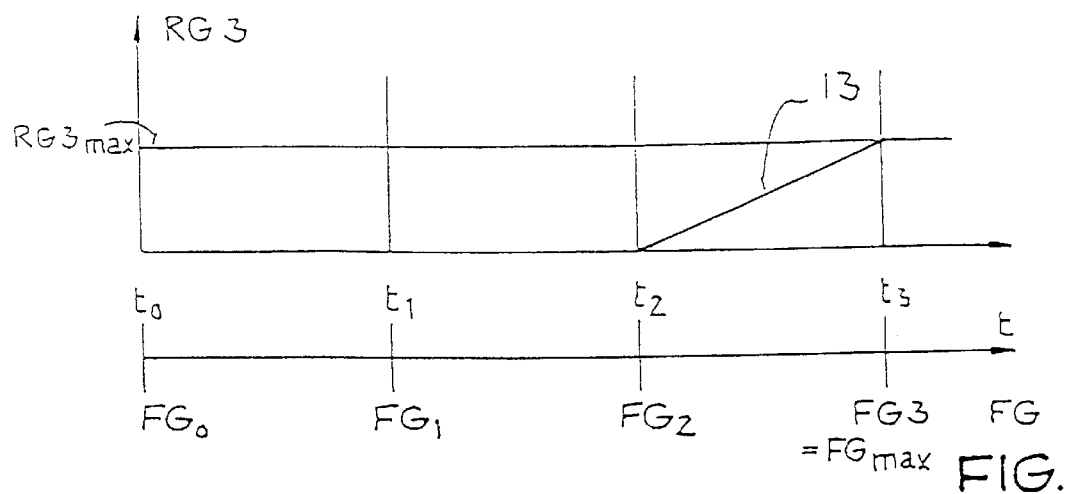
Figure 1:
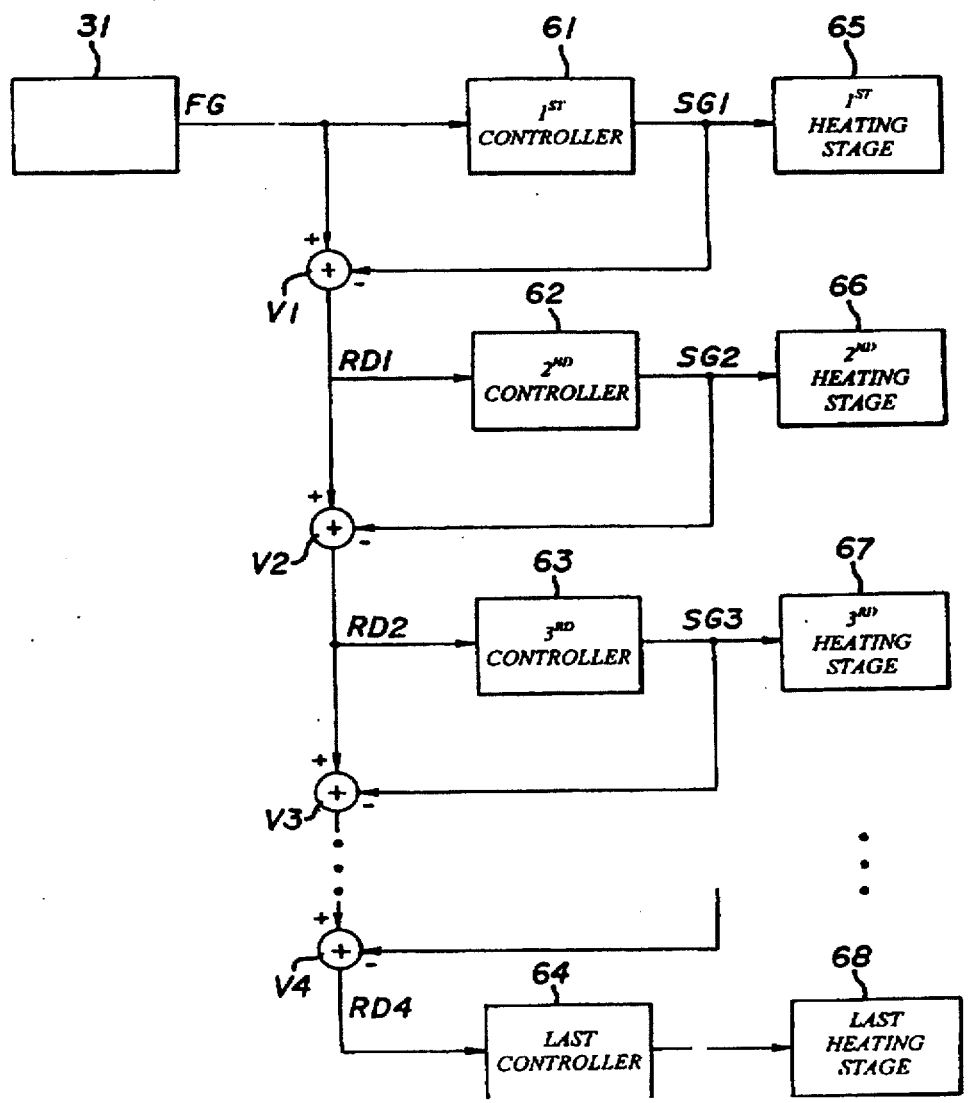
Figure 2:
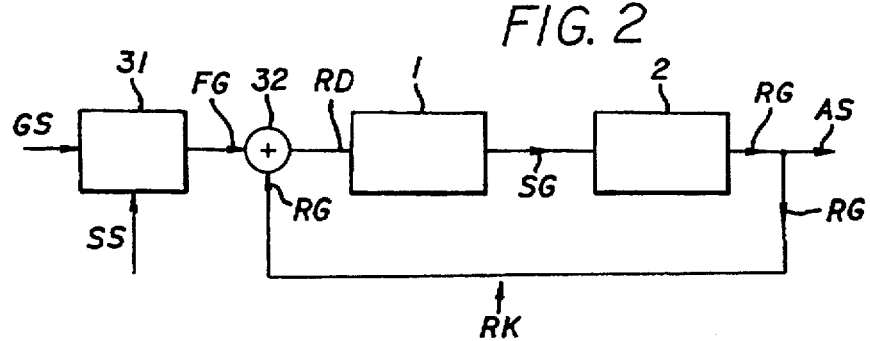
Figure 3:
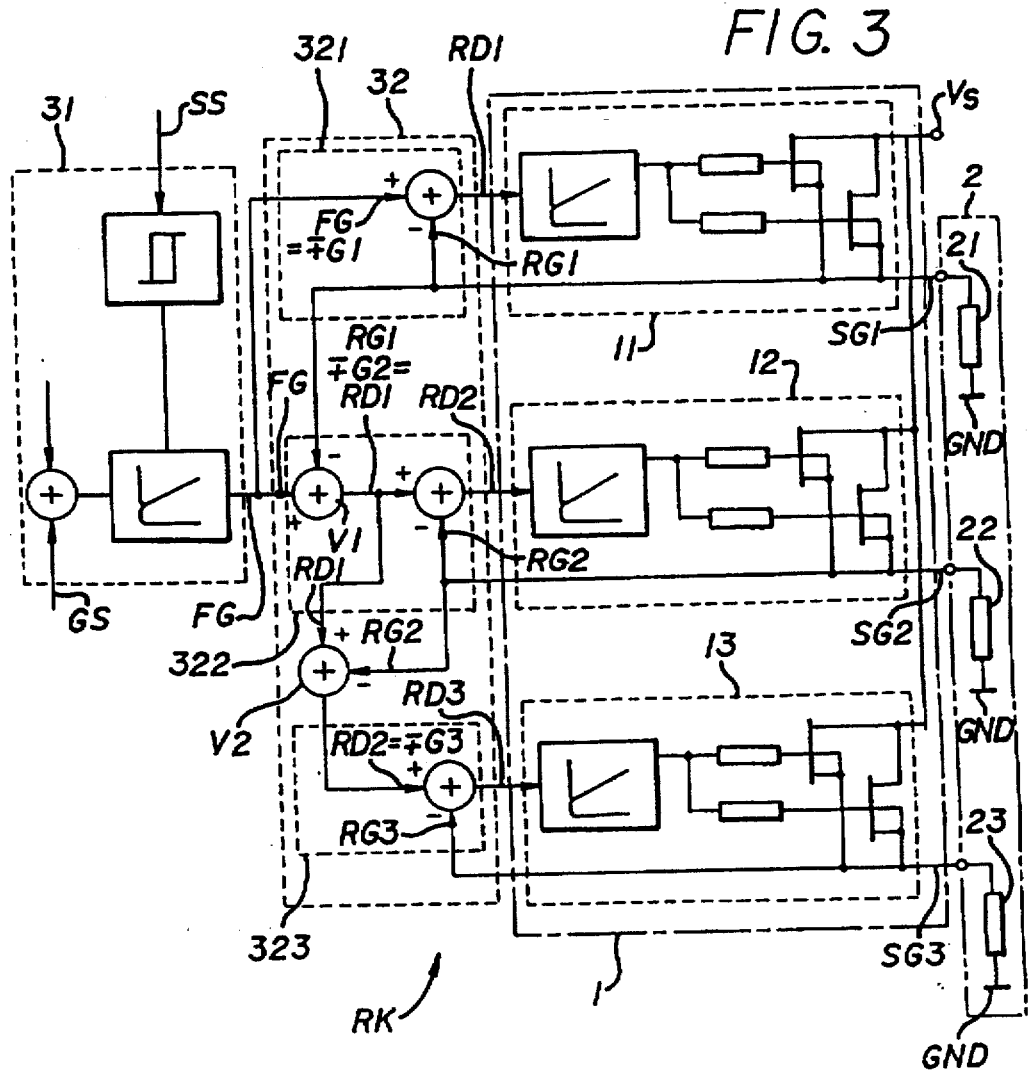
Figure 4:
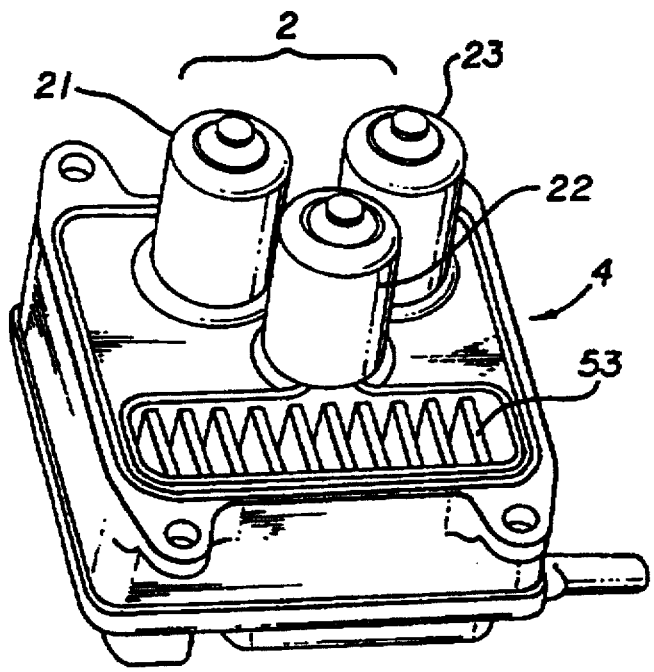
Figure 5:
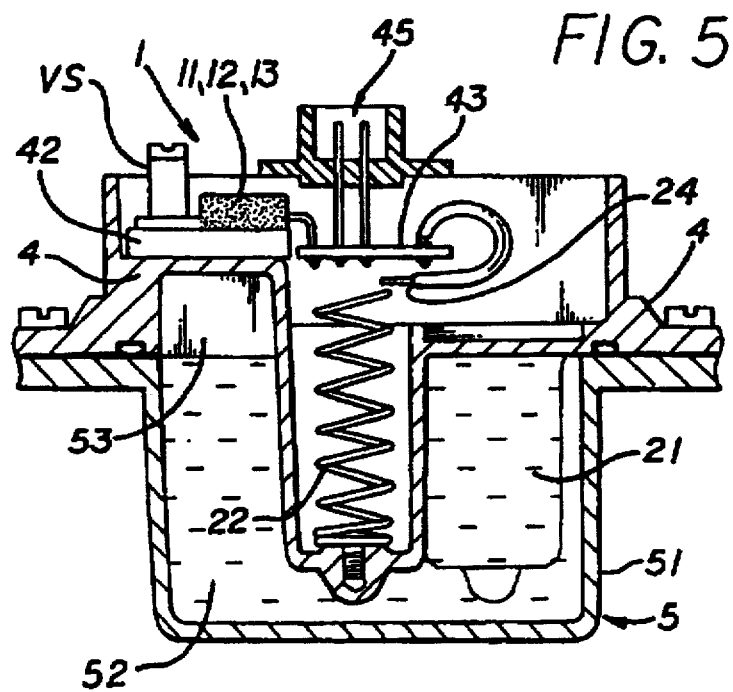
Figure 6:
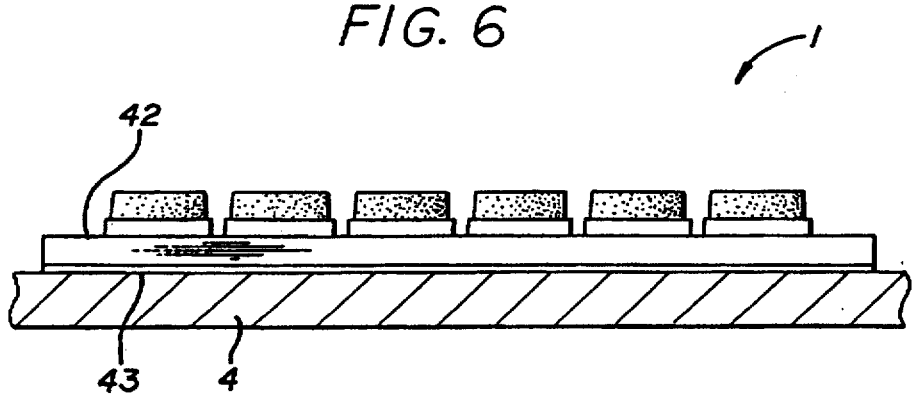

FIG. 7 shows the chronological course of the controlled variables RG1, RG2, RG3 of the individual linear controllers 11, 12, 13 of the control means 1 and the chronological course of the controlled variable RG (total control course) of the control means 1 in a continuous increase of the command variable FG starting at zero up to its maximum value $Fg_{max}$.

Due to the determination of different control differences RD1, RD2, RD3, in this continuous increase of the command variable FG. the cascade linear controllers 11, 12, 13, of the control means connected in parallel are successively activated and thus also determine successively the controlled variables RG (RG=RG1+RG2+R3) formed as a sum of the controlled variables RG1, RG2, RG3 of the linear controllers 11, 12, 13:

at the time $t_0$ (at this time the command variable FG reaches the threshold value $FG_0$) the first linear controller is activated, at an increase of the command variable FG (the command variable FG exceeds the threshold value $FG_0$), the total control course (the controlled variable RG) is determined only by the first linear controller 11 (controlled variable RG1), the second linear controller 12 and the third linear controller 13 are deactivated, since the control difference RD1 of the first linear controller 11 is zero, at the time $t_1$ (at this time the command variable FG reaches the value $FG_1$), the control limit $RG1_{max}$ of the first linear controller 11 is reached (the maximum value $RG1_{max}$ of the controlled variable RG1 of the first linear controller 11) and the first linear controller 11 is driven to its maximum; this causes the second linear controller 12 to be activated, at an increase of the command variable FG (the command variable FG exceeds the value FG1), the control difference RD1 of the first linear controller 11 becomes different to zero and thus the total control course (controlled variable RG) is determined by the first linear controller (controlled variable RG1) and by the second linear controller (controlled variable RG2) (the second linear controller 12 takes over the portion of the controlled variable RG that can no longer be controlled by the first linear controller 11); the third linear controller 13 is deactivated since the control difference RD2 of the second linear controller 12 is zero, at the time $t_2$ (at this time the command variable FG reaches the value $FG_2$), the control limit $RG2_{max}$ of the second linear controller 12 is reached (the maximum value $RG2_{max}$ of the controlled variable RG2 of the second linear controller 12) and the second linear controller 12 is driven to its maximum causing the third linear controller 13 to be activated, at an increase of the command variable FG (the command variable FG exceeds the value $FG_2$), the control difference RD2 of the second linear controller 12 becomes different to zero and thus the total control course (the controlled variable RG) is determined by the first linear controller 11 (controlled variable RG1), by the second linear controller 12 (controlled variable RG2) and by the third linear controller 13 (controlled variable RG3) (the third linear controller 13 takes over the portion of the controlled variable RG that can no longer be controlled by the second linear controller 12), at the time $t_3$ (at this time the command variable FG reaches the value $FG_3$ or its maximum value $FG_{max}$), the control limit $RG3_{max}$ of the third linear controller 13 is reached (the maximum value $RG3_{max}$ of the controlled variable RG3 of the third linear controller) and thus also the control limit $RG_{max}$ of the control means 10 (the maximum value $RG_{max}$ of the controlled variable RG).

As can be taken from FIG. 7, at a tire only one of the linear controllers 11, 12, 13 of tie control means 1 is operated linearly, so that in case of a variation of the command variable FG, a continuous control of the controlled variable RG without any irregularities (hysteresis, jumps), dead portions or overlappings occurs.

The values $FG_1$, $FG_2$ and $FG_3$ of the command variable FG depend on the design or type of the controller used and are obtained in that the controller effective up to that time can no longer attain its predetermined target value (i.e. teaches its control limit).

Figure 4:
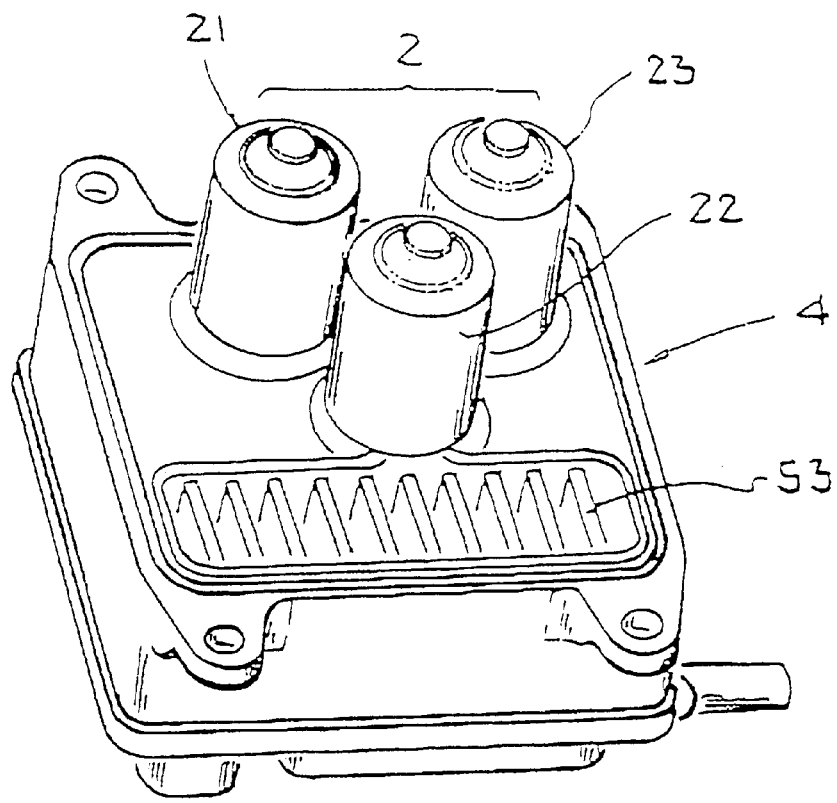
FIG. 4 is a perspective view of the heating system.

According to FIG. 4, showing a perspective view of the heating system, the control circuit RK of the (not shown) control means 1 and the heating 2 (heating stages 21, 22, 23) is integrated in a housing 4. The ribs 53 serve for increasing the surface at the position where the dissipation power of the power semiconductor elements of the control means 1 is generated and thus for increasing the heating effect. The connection of the control circuit RK for the reference potential GND (the earth terminal) can be disposed over the housing 4 so that except for the signal lines only the connection for the supply voltage $V_s$ has to be provided.

Figure 5:
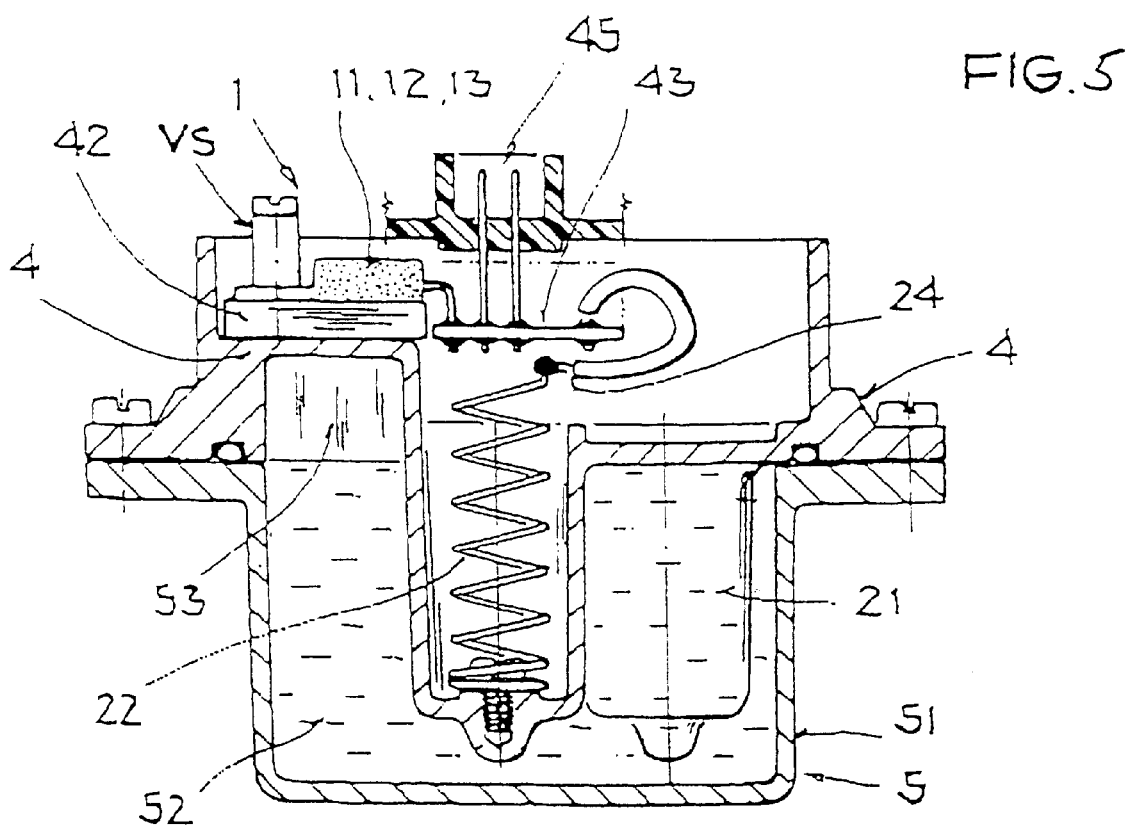
FIG. 5 is a sectional view of the heating system integrated into the circulatory cooling system (e.g. the cooling water circulatory system) of the motor vehicle.

According to FIG. 5, the housing 4 of the heating system is arranged for pre-heating the (cooling) medium 52 of the cooling circuit 5 of a (e.g. water-cooled) motor vehicle in such a manner in the accommodation device 51 of the cooling circuit that the heating 2 with the heating stages 21, 22, 23 or the heating elements are immersed into the cooling medium (e.g. water) and thus within the flow path of the cooling medium (52). The housing 4 comprises a connection member 45 for signal lines, by means of which external signals can be supplied to the heating system (e.g. the control signal SS or the generator signal GS) or in that output signals are provided by the heating system. The semiconductor components of the control means 1 (e.g. the linear controller 11, 12, 13), in particular the power semiconductor components (e.g. power transistors) are commonly arranged on a heat-conducting carrier body 42 (e.g. a copper plate), said carrier body being arranged above the ribs 53; the connection between the (semiconductor components) of the control means 1 and (the heating elements 21, 22, 23) of the heating stage 2 is carried out by means of at least one contact connection 24.

Figure 6:
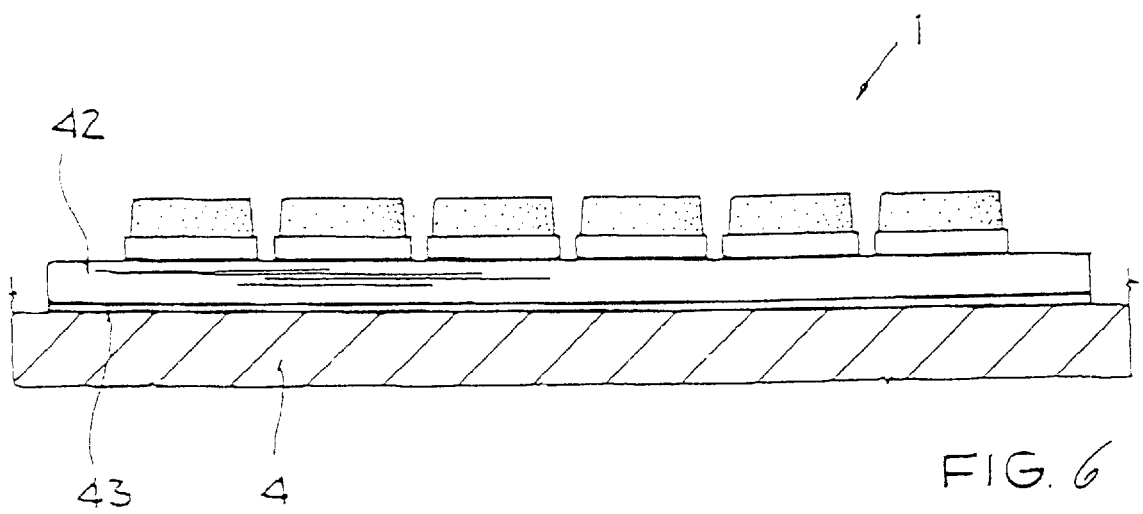
FIG. 6 is an arrangement of the semiconductor component of the control means.

Since the heating elements of the heating stages 21, 22, 23 (the heating resistors) are connected to reference potential GND (earth) and the housings of the power semiconductor components (e.g. the power transistors) of the control means 1 are thus all on the same potential (supply voltage $V_s$), the semiconductor components of the control means 1 can be mounted onto a common carrier body 42. According to FIG. 6, this common carrier body 42 is arranged on the housing 4 (above the ribs 53); between carrier body 42 and housing 4 an insulating layer 43 is provided for electrically insulating the carrier body 42 and the housing 4. Since only one of the linear controllers 11, 12, 13 at a time is operated linearly (and thus a great dissipation power only occurs for this linear controller), and on the contrary the other linear controllers 11, 12, 13 are deactivated (no dissipation power) or are operated in saturation (resulting in a low dissipation power), the common carrier body 42 causes the effective thermal resistance for the respective linear controller 11, 12, 13 in linear operation to be reduced in accordance with the number of linear controllers 11, 12, 13 of the control means 1 and this the temperature load of the semiconductor components (in particular of the power transistors) of the control means 1 is reduced.

The heating system, however, is neither restricted to motor vehicles nor to the described embodiment; the heating elements of the beating stage can also be realized for example by means of PTC elements. Instead or a cooling water heating, the heating system can also be used for different applications within the motor vehicle (e.g. circuit-bound or not circuit-bound), e.g. for heating the air (interior compartment) or for pre-heating the (diesel) fuel.

We claim:

1. An electric heating system, comprising:
a plurality of heating resistors, each heating resistor of said plurality of heating resistors operable in at least one of three operational modes selected from the group consisting of:
a first operational mode wherein said heating resistor generates said heating resistor's maximum heating power;
a second operational mode wherein said heating resistor generates no heating power;
a third operational mode wherein said heating resistor generates any of a plurality of intermediate heating powers between said heating resistor's maximum heating power and no heating power;
a means for selecting as many of said plurality of heating resistors to operate in said first operational mode as necessary to generate a selected total target heating power;
a means for selecting at least one of said heating resistors to operate in said third operational mode; and
a control means for regulating said at least one selected heating resistor, said control means being adapted to vary said intermediate heating power generated by said at least one selected heating resistor to generate said selected total target heating power as the sum of all heating powers generated by all of said plurality of heating resistors which are operated in said first or third operational modes.

2. An electric heating system according to claim 1, characterized in that the electric heating is used to heat the circulatory cooling liquid system of motor vehicles.

3. An electric heating system, comprising:
a plurality of heating resistors, each heating resistor of said plurality of heating resistors operable in at least one of three operational modes selected from the group consisting of:
  a first operational mode wherein said heating resistor generates said heating resistor's maximum heating power;
  a second operational mode wherein said heating resistor generates no heating power;
  a third operational mode wherein said heating resistor generates any of a plurality of intermediate heating powers between said heating resistor's maximum heating power and no heating power;
a control means for regulating a total target heating power of said electric heating system, said control means comprising a number of controllers corresponding to the number of heating resistors, each of said controllers being associated with a different heating resistor of said plurality of heating resistors;
said controllers being adapted to regulate as many of said plurality of heating resistors in said first operational mode as necessary to generate said total target heating power; and
said controllers further being adapted to select a single heating resistor to be operated in said third operational mode wherein said intermediate heating power generated by said selected single heating resistor is regulated to generate said total target heating power as the sum of all heating powers generated by all of said plurality of heating resistors which are operated in said first or third operational modes.

4. The electric heating system of claim 3 wherein said control means has a control range for producing said target heating power, said control range being distributed among said controllers by associating with each of said controllers a portion of said control range.

5. The electric heating system of claim 4:
wherein comparator elements are provided for distributing said control range among said controllers, each having two input terminals and one output terminal;
wherein the output terminal of each comparator element is connected to the input terminal of one of the controllers, except for the controller of the lowest portion of said control range, in order to supply each of said controllers with a detected voltage difference;
wherein the input signal of the controller which is associated with the lower next control range is supplied to a minuend input terminal of said comparator elements; and
wherein a controlling variable generated by said controller which is associated with the lower next control range is supplied to a subtrahend input terminal of said comparator elements.

6. The electric heating system of claim 3:
wherein each of said controllers comprises one linear controller and one comparator element; and
wherein said comparator element supplies said linear controller with a control difference, said control difference calculated from a command variable and an actual value of a resulting controlled variable.

7. The electric heating system of claim 4:
wherein each of said controllers comprises one linear controller and one comparator element; and
wherein said comparator element supplies said linear controller with a control difference, said control difference calculated from a command variable and an actual value of a resulting controlled variable.

8. The electric heating system of claim 5:
wherein each of said controllers comprises one linear controller and one comparator element; and
wherein said comparator element supplies said linear controller with a control difference, said control difference calculated from a command variable and an actual value of a resulting controlled variable.

9. An electric heating system according to claim 5, characterized in that said comparator elements for distributing said control range are integrated into said comparator elements of said controllers which supply said detected voltage difference to said linear controller and as a command variable to the controller of a higher next control range.

10. An electric heating system according to claim 3, characterized in that the electric heating is used to heat the circulatory cooling liquid system of motor vehicles.

11. An electric heating system according to claim 4, characterized in that the electric heating is used to heat the circulatory cooling liquid system of motor vehicles.

12. An electric heating system according to claim 5, characterized in that the electric heating is used to heat the circulatory cooling liquid system of motor vehicles.

13. An electric heating system according to claim 6, characterized in that the electric heating is used to heat the circulatory cooling liquid system of motor vehicles.

* * * * *

UNITED STATES PATENT AND TRADEMARK OFFICE
CERTIFICATE OF CORRECTION

PATENT NO. : 5,990,459
DATED : November 23, 1999
INVENTOR(S) : Hans-Peter Feustel; Klaus Beetz; Franz Bohlender It is certified that error appears in the above-identified patent and that said Letters Patent is hereby corrected as shown below:

<u>Drawings</u>,
Replace sheets 1-5, FIGS. 1-7d with the following attached pages.

Signed and Sealed this

Fifth Day of February, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.    : 5,990,459
DATED         : November 23, 1999
INVENTOR(S)   : Hans-Peter Feustel; Klaus Beetz; Franz Bohlender Title page,
Item [73] Assignees, replace "Alcatel SEG AG" with -- Alcatel SEL AG --.

Figure 7A:
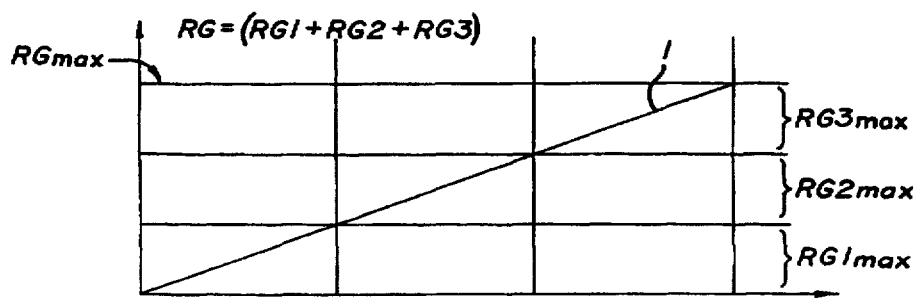
Figure 7B:
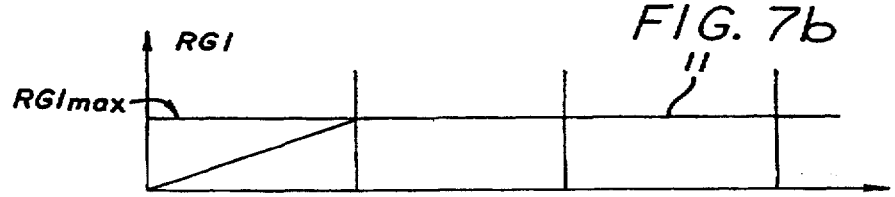
Figure 7C:
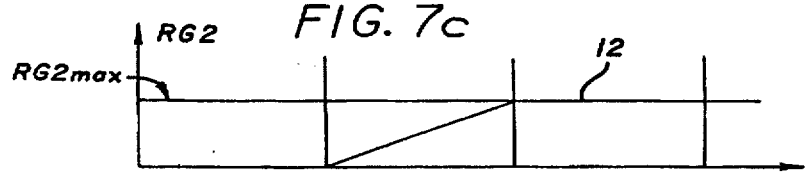
Figure 7D:
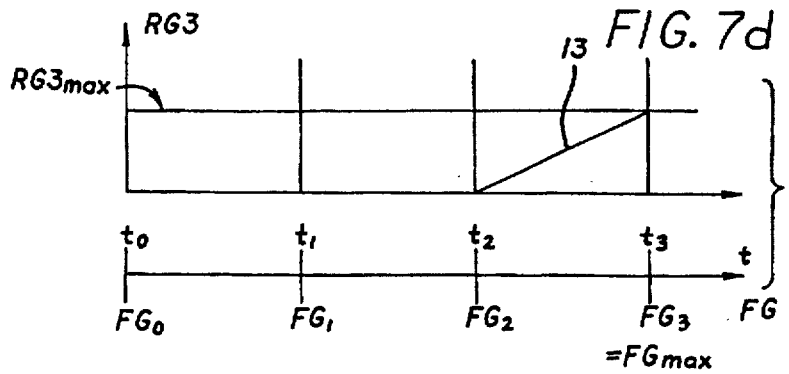

Column 3,
Line 26, replace "FIG 7 is a diagram" with -- FIGS. 7a,b,c and d are diagrams --.

Column 6,
Line 36, replace "FIG. 7 shows" with -- FIGS. 7a,b,c and d show --.

Column 10,
Line 38, replace "voltage difference" with -- control difference --.